April 25, 1944.　　　G. R. STINNETT　　　2,347,522
HARVEST WAGON
Filed Feb. 7, 1942　　　3 Sheets-Sheet 1

Inventor
GEORGE R. STINNETT

By Clarence A. O'Brien
and Harvey B. Jacobson
Attorneys

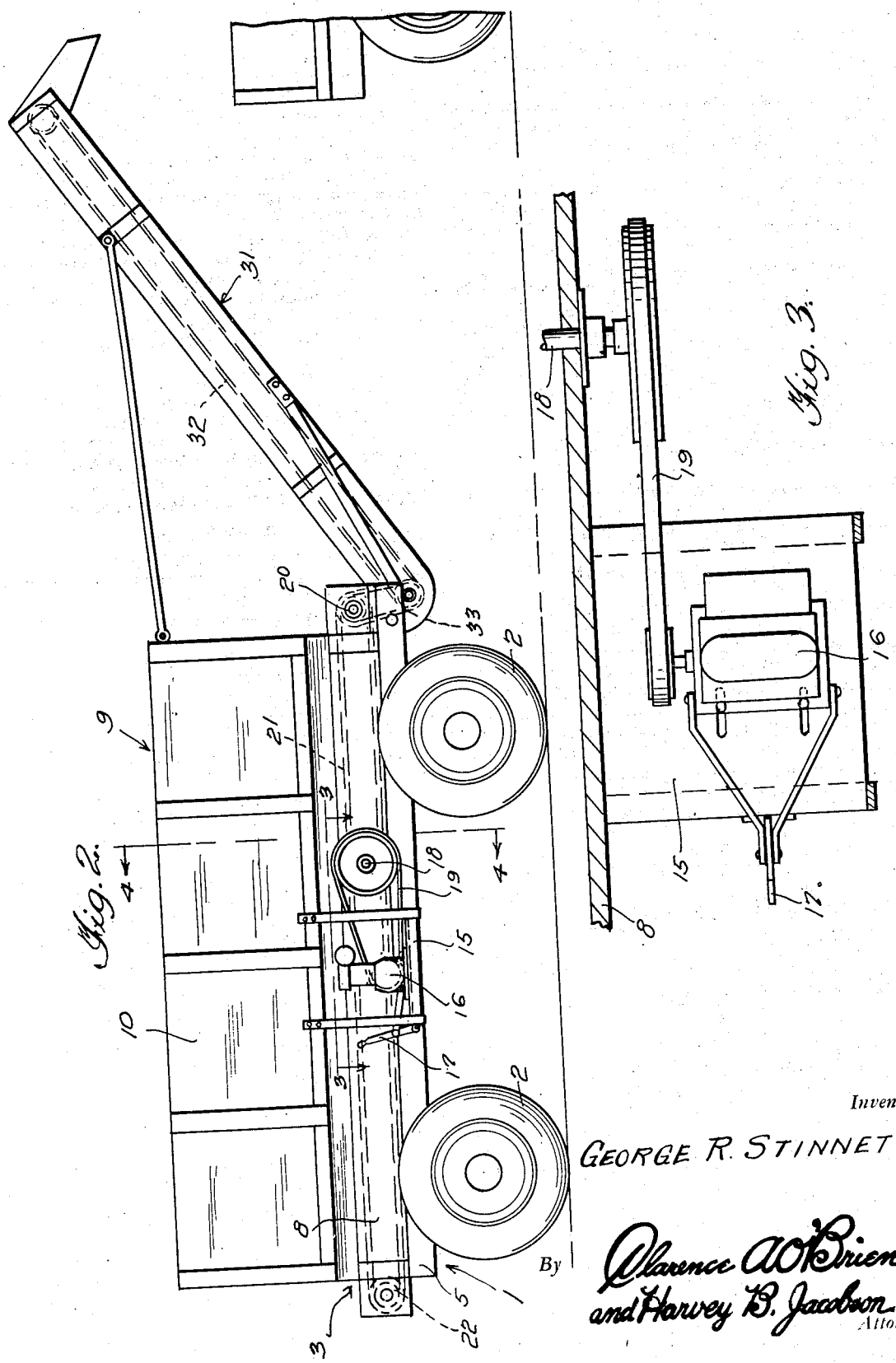

April 25, 1944.　　　　G. R. STINNETT　　　　2,347,522
HARVEST WAGON
Filed Feb. 7, 1942　　　　3 Sheets-Sheet 3

Inventor
GEORGE R. STINNETT

By Clarence A. O'Brien
and Harvey B. Jacobson
Attorneys

Patented Apr. 25, 1944

2,347,522

UNITED STATES PATENT OFFICE 2,347,522

HARVEST WAGON

George R. Stinnett, New Canton, Ill., assignor of one-half to Robie Wallace, New Canton, Ill.

Application February 7, 1942, Serial No. 429,927

1 Claim. (Cl. 214—83)

The present invention relates to new and useful improvements in wagons for use particularly in conjunction with harvesting machines for receiving the grain, et cetera, therefrom, and has for its primary object to provide, in a manner as hereinafter set forth, a vehicle of this character comprising novel unloading means.

Another very important object of the invention is to provide, in a harvest wagon of the aforementioned character comprising a box-type body for the reception of the grain, et cetera, a novel construction and arrangement of frame for supporting said body on a wheeled chassis.

Still another very important object of the invention is to provide a harvest wagon of the character described which includes a unique arrangement for driving the unloading mechanism.

Other objects of the invention are to provide a harvest wagon which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view in side elevation thereof.

Figure 3 is a view in horizontal section, taken substantially on the line 3—3 of Figure 2.

Figure 1:
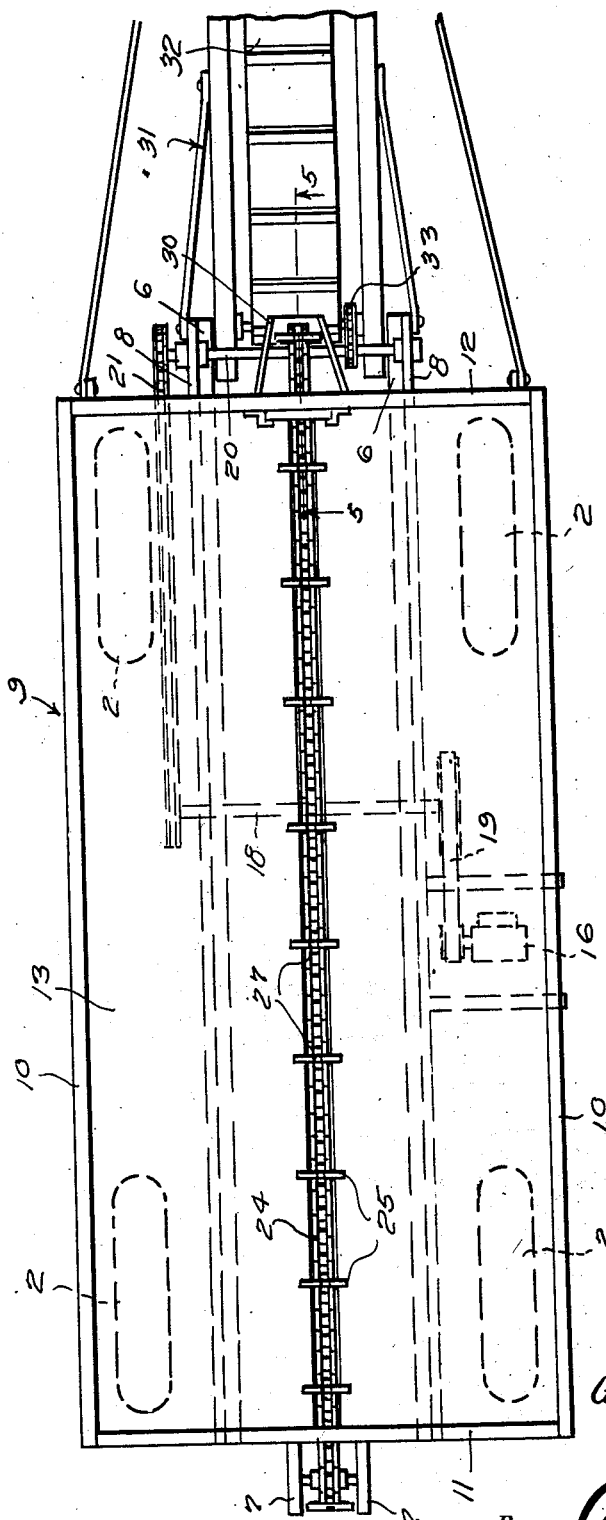
Figure 1 is a top plan view of a harvest wagon constructed in accordance with the present invention.

Referring now to the drawings in detail, it will be seen that reference numeral 1 designates generally a motor vehicle chassis. The chassis 1 includes pneumatic tire equipped wheels 2. The chassis 1 is to be hitched behind a harvesting machine in any suitable manner to be drawn thereby.

Mounted on the chassis 1 is a frame 3. The frame 3 includes cross-members 4 which are mounted at longitudinally spaced points on the chassis frame 5. Mounted on the end portions of the cross-members 4 are longitudinal bars 6. Mounted on intermediate portions of the cross-members 4 are longitudinal sills or the like 7.

Comparatively high sills 8 are mounted longitudinally on the members 6.

Mounted on the frame structure 3 is a box-type body 9. The body 9 includes sides 10, a front end 11, a rear end 12 and a substantially synclinal bottom 13 having a longitudinal slot 14 extending from end to end thereof in its lowermost portion. If desired, the bottom 13 may be provided with a suitable metallic lining.

Mounted beneath one side portion of the body 9 is a support 15. A suitable engine 16 is mounted for sliding adjustment on the support 15 longitudinally of the body 9. A hand lever 17 is operatively connected to the engine 16 for shifting same.

Journaled in the frame structure 3 at an intermediate point is a transverse shaft 18. The engine 16 drives the shaft 18 through a belt and pulley connection 19. This drive is controlled as desired by shifting the engine 16 through the medium of the lever 17.

Figures 4, 5:
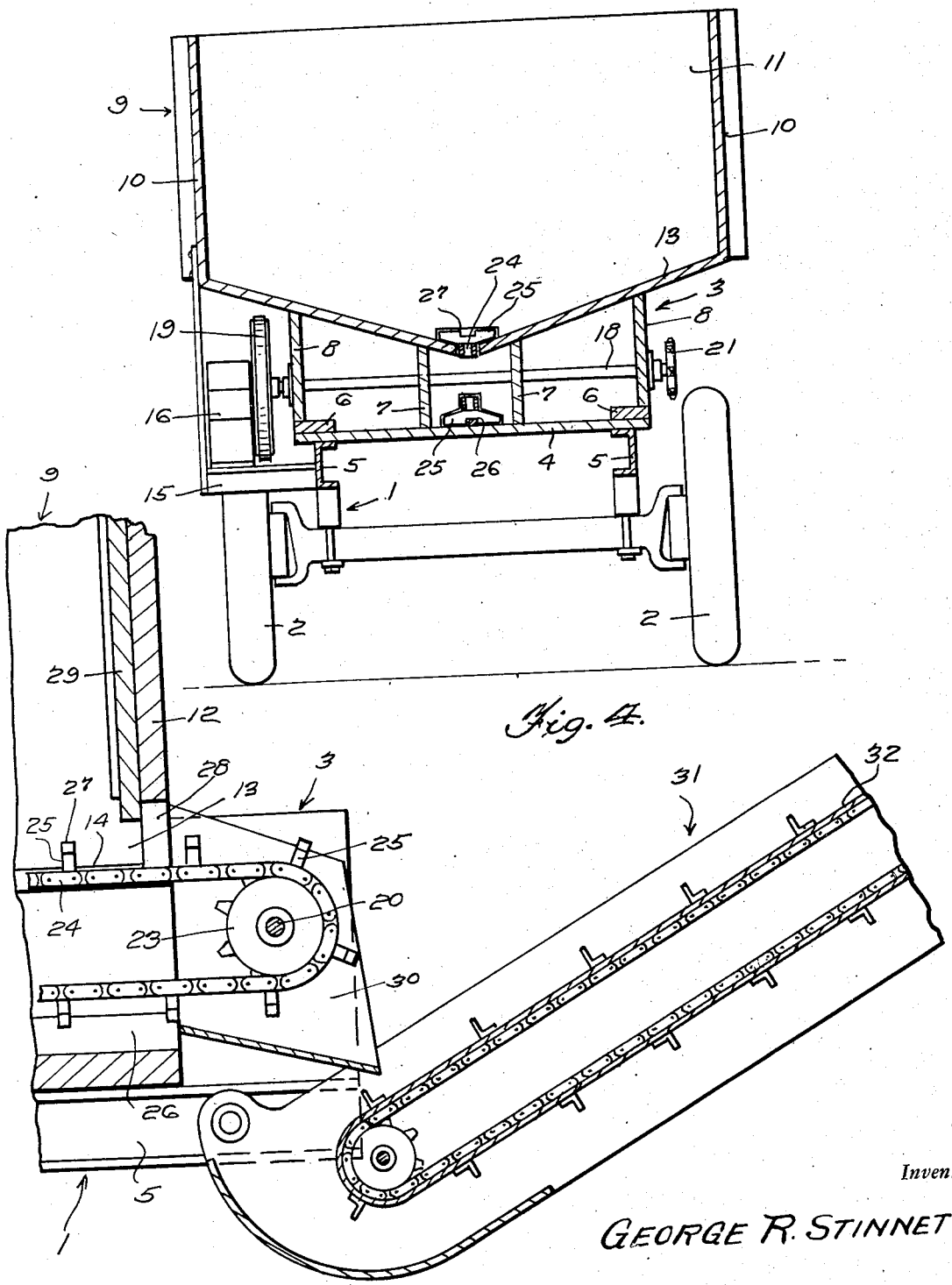
Figure 4 is a cross-sectional view, taken substantially on the line 4—4 of Figure 2.
Figure 5 is a fragmentary view in vertical longitudinal section, taken substantially on the line 5—5 of Figure 1.

Journaled transversely in the rear end portion of the frame structure 3, rearwardly of the body 9, as seen in Figure 1 of the drawings, is a shaft 20. A chain and sprocket connection 21 operatively connects the shaft 18 to the shaft 20. Mounted on the front extremity of the frame structure 3, forwardly of the body 9, is a sprocket structure 22. A sprocket 23 (see Fig. 5) is fixed on the shaft 20.

Trained around the sprockets 22 and 23 is an endless conveyor in the form of a drag chain 24, the upper flight of which is adapted to travel in the slot 14 from the front to the rear end of the body 9. Fixed on the conveyor chain 24 at spaced points are cleats or lugs 25 which travel on the bottom 3 of the body 9 adjacent the opposite sides of the slot 14 and which, it will be noted, conform substantially to the shape of said bottom 13. The lugs 25, in addition to moving the material to the rear end of the body 9 where said material is discharged, support the upper flight of the conveyor chain 24 in the slot 14. Mounted longitudinally on the cross-members 4 of the frame 3 below the conveyor chain 24 is a guide 26 for the returning lugs 25 on the lower flight of said conveyor chain 24. The lugs 25 are provided with notches or recesses 27 which accommodate the guide 26.

Referring again to Figure 5 of the drawings, it will be observed that the rear end 12 of the body 9 has formed in its lower portion a discharge or outlet opening 28 in which the rear end portion of the conveyor 24 is operable. The discharge of the grain, et cetera, through the opening 28 is regulated as desired through the medium of a gate 29 which is mounted for vertical sliding adjustment on the rear end 12 of the body 9. Any suitable means may be provided for actuating or adjusting the gate 29. Projecting rearwardly from the opening 28, on the rear end 12 of the body 9, is a chute 30. It may be well to here state that the chute 30 receives the grain, et cetera, from the opening 28.

Mounted for swinging adjustment in a vertical plane on the rear end portion of the chassis frame 5 is an elevator 31 of the type comprising an endless conveyor 32, et cetera. A chain and sprocket connection 33 drives the endless conveyor 32 of the elevator 31 from the shaft 20. It will thus be seen that the conveyors 24 and 32 are connected for operation in unison and driven from a single source of power. Of course, any suitable speed ratios may be had.

It is thought that the operation of the device will be readily apparent from a consideration of the foregoing. Briefly, the wagon is hitched behind a harvesting machine and the grain, et cetera, from said machine is discharged into the body 9. To empty or unload the body 9 at any suitable point it is only necessary, with the engine 16 running, to shift said engine through the medium of the hand lever 17 in a manner to tighten the belt 19, thereby driving the shaft 18, the shaft 20, et cetera. The conveyor 24 moves the grain, et cetera, rearwardly in the body 9 and discharges it into the chute 30 from which said grain, et cetera, flows onto the endless conveyor 32 of the elevator 31. The substantially synclinal bottom 13 of the body 9 causes the grain, et cetera, to gravitate to the conveyor 24.

It is believed that the many advantages of a harvest wagon constructed in accordance with the present invention will be readily understood, and although a preferred embodiment of the vehicle is as illustrated and described, it is to be understood that changes in the details of construction and in the combination and arrangement of parts may be resorted to which will fall within the scope of the invention as claimed.

What is claimed is:

A harvest wagon of the character described comprising a wheeled chassis including a pair of longitudinal side members, bars mounted transversely on said side members at spaced points, longitudinal bars mounted on the end portions of the first-named bars, sills rising from the longitudinal bars, comparatively low sills mounted at intermediate points on the first-named bars and paralleling the first-named sills, a body including a synclinal bottom mounted on the first and second-named sills, said bottom having a longitudinal slot in its lower portion, a chute on one end of the body communicating therewith, the side members of the chassis projecting beyond said one end of the body, an elevating conveyor hingedly mounted for vertical swinging adjustment on the projecting end portions of said side members for receiving material from the chute, and an endless conveyor operable in the body and the chute for removing material from said body on the elevating conveyor.

GEORGE R. STINNETT.